United States Patent [19]

Yamaguchi et al.

[11] Patent Number: 4,673,435

[45] Date of Patent: Jun. 16, 1987

[54] ALUMINA COMPOSITE BODY AND METHOD FOR ITS MANUFACTURE

[75] Inventors: Masayoshi Yamaguchi; Kazunori Meguro; Shuitsu Matsuo, all of Oguni; Yasumi Sasaki, Nagai, all of Japan

[73] Assignee: Toshiba Ceramics Co., Ltd., Tokyo, Japan

[21] Appl. No.: 855,448

[22] Filed: Apr. 24, 1986

[30] Foreign Application Priority Data

May 21, 1985 [JP] Japan ................................. 60-106931
May 21, 1985 [JP] Japan ................................. 60-106932
May 21, 1985 [JP] Japan ................................. 60-106933
May 21, 1985 [JP] Japan ................................. 60-106936
May 21, 1985 [JP] Japan ................................. 60-106942

[51] Int. Cl.$^4$ ............................................. C22C 29/12
[52] U.S. Cl. ........................................ 75/235; 75/229; 419/2; 419/19; 419/23
[58] Field of Search .................... 75/235, 229; 419/19, 419/2, 23

[56] References Cited

U.S. PATENT DOCUMENTS

| | | | |
|---|---|---|---|
| 2,702,750 | 2/1955 | George | 419/19 |
| 2,729,880 | 1/1956 | Miller | 75/235 |
| 2,894,319 | 7/1959 | Thomson | 75/235 |
| 2,961,325 | 11/1960 | Mayfield | 419/19 |
| 3,526,485 | 9/1970 | Dawihl et al. | 419/19 |
| 3,816,080 | 6/1974 | Bomford et al. | 75/235 |
| 3,841,847 | 10/1974 | Jones et al. | 75/235 |
| 4,193,793 | 3/1980 | Cheung | 75/235 |

*Primary Examiner*—Stephen J. Lechert, Jr.
*Attorney, Agent, or Firm*—Schwartz, Jeffery, Schwaab, Mack, Blumenthal & Evans

[57] ABSTRACT

An alumina composite body comprising a plurality of elongated alumina elements oriented in random directions and interconnected so as to constitute a porous matrix, and aluminum and silicon tightly filling the porous matrix; and a method of manufacturing an alumina composite body comprising reacting a body of silica, or a body of a silicon compound such as silicon carbide or silicon nitride which has been at least partially oxidized to produce silica, with aluminum so as to change the silica into alumina.

10 Claims, 12 Drawing Figures

ALUMINA COMPOSITE BODY AND METHOD FOR ITS MANUFACTURE

BACKGROUND OF THE INVENTION

This invention relates to an alumina composite body and a method for its manufacture, particularly to an alumina composite body comprising alumina, aluminum and silicon.

Alumina ceramic materials have excellent hardness, mechanical strength, heat resistance and chemical stability. Their heat resistance is not inferior to that of other ceramic materials such as silicon carbide and silicon nitride. In addition, alumina ceramic materials are inexpensive, so that alumina ceramic materials are widely used as industrial ceramic materials as described by Japanese Published Patent Application No. 54-87716.

Conventionally, alumina ceramic products are made by forming fine alumina particles into desired shape and then firing the formed shape, or by forming and firing fine alumina particles at the same time as described by Japanese Published Patent Application No. 57-95870 or Japanese Patent Publication No. 59-25748. As shown in FIG. 1, a conventional alumina ceramic material constitutes alumina particles 21 having a simple shape.

Conventional alumina ceramic materials have the following disadvantages:
(1) The workability is bad due to their hardness.
(2) The shock resistance is low because of their brittleness. Generally speaking, the shock break resistance of ceramic materials is inferior to that of metals.
(3) It is difficult to exactly form any complex shapes of alumina ceramic products.
(4) The firing temperature is a high temperature on the order of from 1500° to 1900° C.
(5) The shrinkage on firing is large.
(6) The thermal shock resistance is low.
(7) The lubricity is inferior to that of the metals.

Although alumina ceramic materials have many excellent basic characteristics, because of these disadvantages they cannot be used satisfactorily as structural materials which must satisfy severe strength and mechanical reliability requirements.

SUMMARY OF THE INVENTION

The object of this invention is to provide an alumina composite body which has excellent strength and high mechanical reliability.

Another object of this invention is to provide an alumina composite body which is integrally connected to another material such as aluminum, quartz glass or a silicon compound other than an oxide of silicon.

Yet another object of this invention is to provide a method of manufacturing an alumina composite body in which any complex shape can be obtained easily and at low production cost.

A further object of this invention is to provide a method of manufacturing an alumina composite body which is connected to another material such as aluminum, quartz glass or a silicon compound other than an oxide.

These and other objects of the invention are achieved according to one aspect of the present invention by providing an alumina composite body coomprising a plurality of elongated alumina elements oriented in random directions and interconnected so as to constitute a porous matrix, aluminum and silicon distributed throughout the porous matrix in intimate association with the aluminum.

The objects are achieved according to another aspect of the present invention by providing a method for manufacturing an alumina composite body comprising the step of reacting a formed glass body consisting essentially of silica with aluminum so as to change said silica into alumina.

According to another aspect of the present invention, the objects are achieved by providing a method of manufacturing an alumina composite body comprising the steps of oxidizing a formed body comprising a silicon compound other than a silicon oxide so as to produce silica, and reacting the silica in the formed body with aluminum so as to change the silica into alumina.

Further objects, features and advantages of the invention will become apparent from the following description of preferred embodiments when considered together with the accompanying drawings.

DETAILED DESCRIPTION OF PREFERRED EMBODIMENTS

Figure 2:
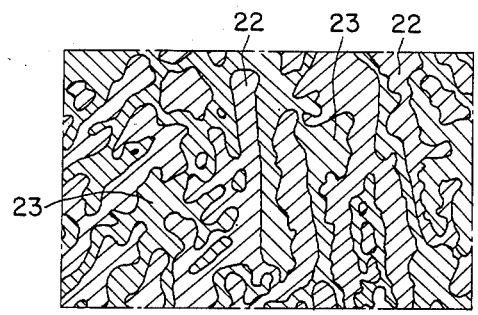
FIG. 2 is a sectional view showing the fine structure of an alumina composite body according to the present invention.
Figure 1:
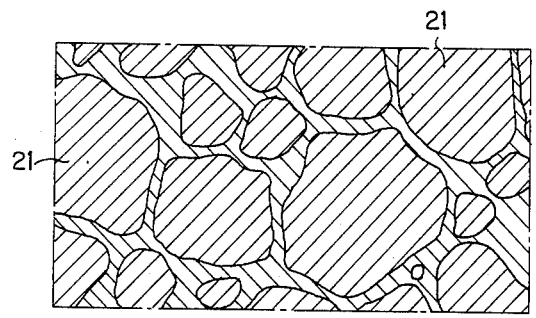
FIG. 1 is a sectional view showing the fine structure of a conventional alumina ceramic material.

An alumina composite body according to the present invention can be manufactured by the following method. First, a formed glass body comprising silica ($SiO_2$), such as a formed quartz glass body, is prepared. The formed glass body may be formed to any desired shape. Thereafter, the formed glass body is immersed in molten aluminum of at least 99% purity, desirably at least 99.9% pure, under a vacuum of from about 10 to 15 Torr or in an inert gas atmosphere. Aluminum (Al) and silica ($SiO_2$) react according to the following equation:

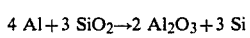

so that silica in the formed glass body is changed into alumina ($Al_2O_3$). As a result, an alumina composite body comprising alumina and a solid solution of aluminum and silica is produced. After that, the alumina composite body is removed from the molten aluminum and then heated for from about 30 to 120 minutes under vacuum of from about 10 to 15 Torr at a temperature of from about 780° to 950° C., which is higher than the melting point of aluminum by from about 30° to 200° C. Thereby, excess molten aluminum on the surface of the alumina composite body is vaporized and removed, and any unreacted silica is thereby reacted with aluminum, and excess molten aluminum in the alumina composite body is removed. At the same time, the strain in the alumina composite body is eliminated.

In another method embodiment, aluminum is vapor deposited onto the aforementioned glass body under a vacuum of from about 10 to 15 Torr or in an inert gas atmosphere. The aluminum desirably has a purity of at least 99%, most preferably at least 99.9%. Aluminum and silica react according to the following equation:

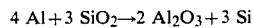

so that silica in the formed glass body is changed into alumina. As a result, an alumina composite body comprising alumina and a solid solution of aluminum and silicon is produced.

In the both of the foregoing methods, the formed glass body comprises a silica material such as quartz glass. If desired, the formed glass body may include other oxides such as alumina, sodium oxide and/or calcium oxide. Also, the formed glass body may consist of a single piece, a bundle of fibers, a bundle of whiskers or silica in any other form.

Further, in this invention excess aluminum may be retained to connect the alumina composite body. If desired, the excess aluminum may cover the surface of the alumina composite body as an aluminum layer to provide two layer structure consisting of the alumina composite body and the aluminum layer. Also, a part of the formed glass body may be reacted with aluminum. If desired, the surface of the formed glass body may be reacted with aluminum so as to provide two layer structure consisting of an alumina composite layer, for example, having a thickness of from about 1 micron to 100 microns, on the underlying formed glass body.

The resultant alumina composite body comprises a large number of elongate alumina elements oriented in random directions and interconnected so as to constitute a porous alumina matrix containing a large number of fine pores, and a solid solution of aluminum and silicon tightly filling the fine pores of the matrix. The alumina elements have complicated shapes and are interconnected to form a three-dimensionally cross-linked structure. The pores of the porous alumina matrix have an average pore radius of from about 0.5 micron to about 1.5 microns. At least 90% of the fine pores have a pore radius of from about 0.1 micron to 10 microns. The porous alumina matrix has an apparent porosity of from about 20% to 30%. The alumina composite body desirably has a gas permeability of less than about 1%.

On the other hand, the resultant alumina composite body exhibits a bending strength of from about 380 to 490 MPa, a Vickers hardness of from about 1300 to 2000 kg/mm$^2$, a critical stress intensity factor (Klc) of from about 5.8 to 6.8 MN/m$^{3/2}$, and a bulk density of from about 3.20 to 3.60 g/cc.

Further, the alumina composite body desirably comprises 50% to 90% by weight alumina, 5% to 25% by weight aluminum, and 2% to 25% by weight silicon.

The composition of the alumina composite body can be adjusted by changing the reaction time between the formed glass body and the aluminum. For example, in the immersion method, during the immersion the silicon formed by the reaction of silica with molten aluminum dissolves in the molten aluminum thereby decreasing the silicon content of the alumina composite body.

The contents of alumina, aluminum and silicon are limited as mentioned above for the following reasons:

(1) If the alumina content is less than 50% by weight, the mechanical strength and heat resistance are lower and the abrasion resistance is inferior. Conversely, if the alumina content exceeds 90% by weight, the fracture toughness is low and the composite body is brittle.

(2) If the aluminum content is less than 5% by weight, the alumina and silicon contents increase, and the fracture toughness is low. Conversely, if the aluminum content exceeds 25% by weight, the abrasion resistance is lower.

(3) If the silicon content is less than 2% by weight, the strength characteristics are not affected, but an extremely long time is required to react the formed glass body with aluminum so as to decrease the silicon content, and therefore the production cost rises. Conversely, if the silicon content exceeds 25% by weight, the mechanical strength decreases.

In another method of manufacturing an alumina composite body, a formed body comprising a silicon compound other than an oxide or silicon, such as silicon carbide or silicon nitride, is first prepared. The body may be formed into any desired shape. Thereafter, the formed body is heated in an oxidizing atmosphere and oxidized so that silica is produced in the formed body. Then, the silica-containing formed body is reacted with aluminum by the immersion method or by the vapor-deposition method. Aluminum and silica are reacted according to the following equation:

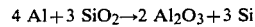

so that the silica in the oxidized, formed body is changed into alumina. As a result, at least part of the original formed body of silicon material other than an oxide is converted to an alumina composite material comprising alumina and a solid solution of aluminum and silicon. If the immersion technique is used, the composite body may be heated under vacuum of from about 10 to 15 Torr at a temperature of from about 780° to 950° C. after removal from the molten aluminum. Any unreacted silicon is thereby reacted with aluminum, and excess molten aluminum on the surface of the alumina composite body is vaporized and removed. Also, the strain in the alumina composite body is eliminated at the same time.

In the method described above, the formed body comprising a silicon compound other than an oxide may be only partially oxidized so that an alumina composite body connected with the silicon non-oxide compound body is produced.

The invention is illustrated in further detail by the following non-limiting examples:

EXAMPLE 1

Figure 8:
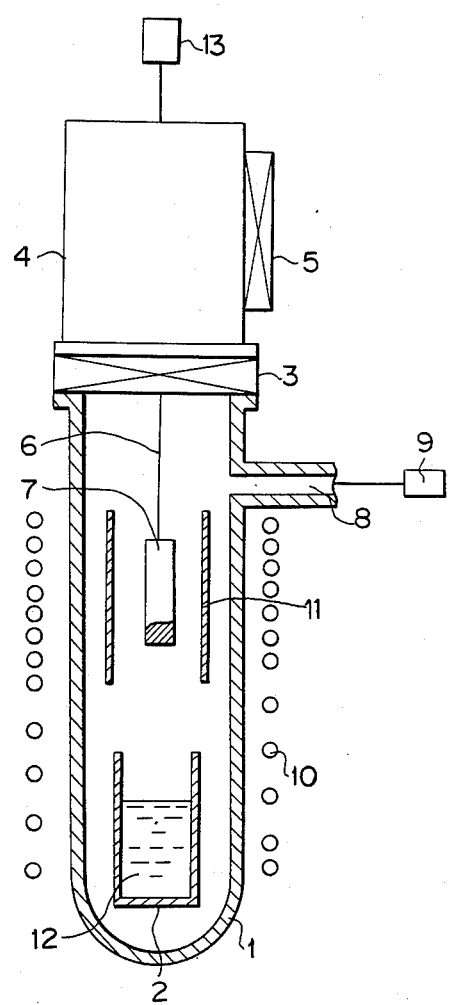
FIG. 8, FIG. 9 and FIG. 10 are schematic illustrations of reaction furnaces for use in the method of the invention.

FIG. 8 shows schematically an example of a reaction furnace for producing an alumina composite body. Reaction furnace 1 is made of quartz glass and is open at its top and closed at its bottom. A crucible 2 made of high purity carbon is arranged within the reaction furnace. A shutter 3 is placed on top of reaction furnace 1, and an entrance portion 4 is disposed on the shutter 3. Another shutter 5 is positioned at one side of entrance portion 4. A holding means, such as line 6, extends vertically through entrance portion 4 and shutter 3. An upper part of the holding means 6 is connected to a vertical actuation mechanism 13 so that holding means 6 can move up and down. The lower end of holding means 6 is designed to hold a formed glass body 7. An outlet 8 is formed at one side toward the top of reaction furnace 1 and connected to a vacuum pump 9. A heater 10 is arranged outside the reaction furnace 1 in a spiral shape. The coils of heater 10 are arranged closer to each other above crucible 2 than adjacent the crucible, so that the region above the crucible can be heated to a higher temperature. A tube 11 made of high purity carbon is disposed within the higher temperature region. Crubible 2 is filled with molten 99.9% pure aluminum 12.

A glass body 7 consisting of a single, cylindrical piece of quartz glass was prepared. Shutter 5 was opened; the formed glass body 7 was attached to the lower end of holding means 6 in entrance portion 4, and then shutter 5 was closed. Next, shutter 3 was opened, and the formed glass body 7 was lowered into the molten aluminum 12 at a temperature of 750° C. The formed glass body 7 was immersed in the molten aluminum 12 under vacuum of 15 Torr for 30 minutes. Aluminum and silica reacted according to the following equation:

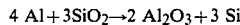

$$4\ Al + 3SiO_2 \rightarrow 2\ Al_2O_3 + 3\ Si$$

so that the silica in the formed glass body 7 was changed into alumina. Thus, an alumina composite body comprising alumina, aluminum and silicon was produced. Holding means 6 was thereafter raised to remove the alumina composite body from the molten aluminum 12 and lift it up into tube 11. The alumina composite body was heated in tube 11 at a temperature of 800° C. for 50 minutes. Next, the alumina composite body was moved up into entrance portion 4, and shutter 3 was closed. Shutter 5 was then opened, and the alumina composite body was detached from the holding means 6.

Figure 3:
FIG. 3 is a photomicrograph showing an alumina composite body according to the present invention.

The resultant alumina composite body is shown in FIGS. 2 and 3. FIG. 3 is a photomicrograph showing the fine structure of the alumina composite body, and FIG. 2 is a explanatory view of FIG. 3. As is apparent from FIGS. 2 and 3, the alumina composite body of the invention comprises many elongated alumina elements 22 and a solid solution 23 of aluminum and silicon. The alumina elements 22 are oriented in random directions and interconnected so as to constitute a porous alumina matrix. The solid solution 23 of aluminum and silicon tightly filled the pores of the porous alumina matrix.

Figure 4:
FIG. 4 is a photomicrograph at 1000 magnifications showing a porous alumina matrix according to the present invention.
Figure 5:
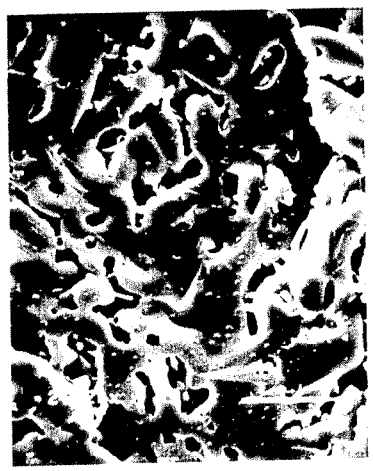
FIG. 5 is a photomicrograph at 2000 magnifications showing a porous alumina matrix according to the present invention.
Figure 6:
FIG. 6 is a photomicrograph at 7000 magnifications showing a porous alumina matrix according to the present invention.
Figure 7:
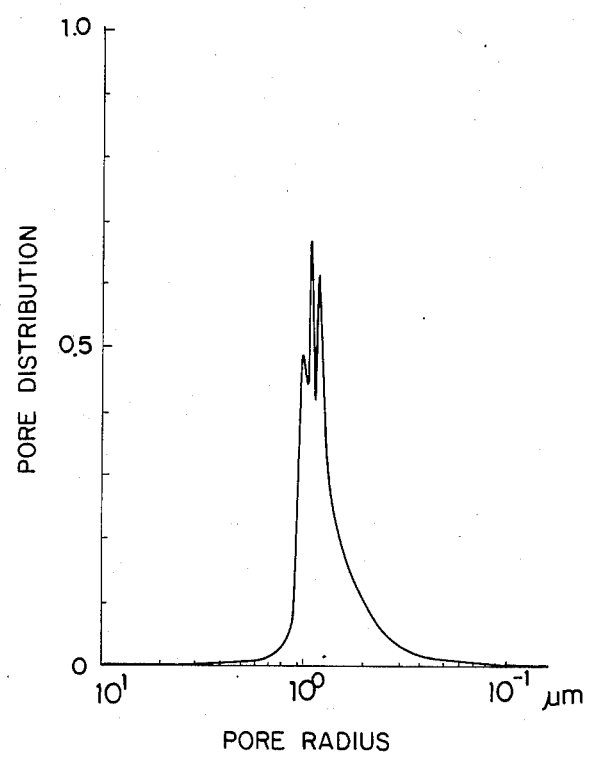
FIG. 7 is a graph showing fine pore characteristics of a porous alumina matrix according to the present invention.

The porous alumina matrix from which the solid solution has been removed by etching is shown in FIGS. 4 to 6. The porous alumina matrix comprises a large number of elongated alumina elements having complicated shapes which are interconnected to form a three-dimensionally cross-linked structure. FIG. 7 shows the pore distribution of the porous alumina matrix. According to FIG. 7, the pores of the alumina matrix are fine, having radii between about 0.1 micron and 10 microns and an average pore radius between about 0.9 micron and 1 micron.

The resultant alumina composite body was composed of 76% by weight alumina, 16% by weight aluminum and 8% by weight silicon. The alumina composite body exhibited a bending strength of 450 Mpa, a Vickers hardness of 1600 kg/mm², a critical stress intensity factor (Klc) of 6.2 MN/m$^{3/2}$, a bulk density of 3.40 g/cc and a thermal expansion coefficient of $10 \times 10^{-6}$/°C.

EXAMPLE 2

Figure 9:
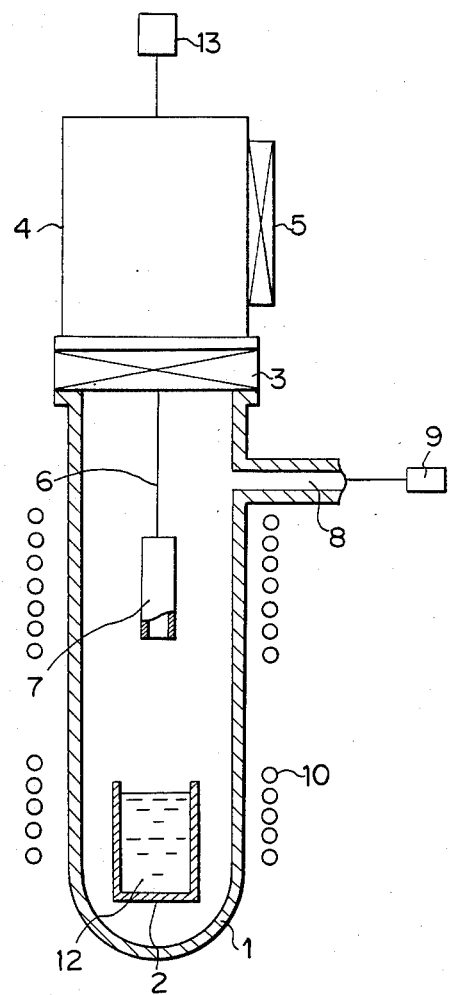

FIG. 9 shows schematically an example of a vapor-depositing apparatus for producing an alumina composite body. Reaction furnace 1 is made of quartz glass and is open at its top and closed at its bottom. A crucible 2 made of high purity carbon is arranged within reaction furnace 1. A shutter 3 is placed on top of the reaction furnace 1. An entrance portion 4 is disposed on the shutter 3. Another shutter 5 is positioned at one side of entrance portion 4. A holding means, such as line 6, extends vertically through the entrance portion 4 and shutter 3. An upper part of the holding means 6 is attached to a vertical actuation mechanism 13, and the lower end of holding means 6 is designed to hold a formed glass body 7. An outlet 8 is formed at one side toward the top of reaction furnace 1 and connected to a vacuum pump 9. A heater 10 is spirally arranged outside reaction furnace 1, particularly outside the crucible 2 and the region above the crucible. Crucible 2 is filled with 99.9% pure molten aluminum 12.

A glass body 7 consisting of a single tubular piece of quartz glass was prepared. Shutter 5 was opened; formed glass body 7 was attached to the lower end of holding means 6, and shutter 5 was then closed. Next, shutter 3 was opened, and formed glass body 7 was lowered to a position above crucible 2 as shown in FIG. 9. The formed glass body 7 was maintained at a temperature of 900° C. under a vacuum of 15 Torr. The molten aluminum 12 was heated at a temperature of 1200° C. and vaporized so that aluminum was vapor-deposited for 60 minutes onto the formed glass body. Aluminum and silica reacted according to the following equation:

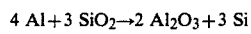

$$4\ Al + 3\ SiO_2 \rightarrow 2\ Al_2O_3 + 3\ Si$$

so that the silica in formed glass body 7 was changed into alumina, and an alumina composite body was produced. After that, holding means 6 was raised until the alumina composite body was received in the entrance portion 4. After shutter 3 was closed, shutter 5 was opened, and the alumina composite body was detached from holding means 6.

The resulting alumina composite body comprised a large number of elongated alumina elements oriented in random directions and interconnected so as to constitute a porous alumina matrix, and a solid solution of aluminum and silicon tightly filling the spaces between the alumina elements. The alumina elements had complicated shapes and were interconnected to form a three-dimensionally cross-linked structure. The alumina composite body was composed of 74% by weight alumina, 15% by weight aluminum and 11% by weight silicon, and exhibited a bending strength of 400 Mpa.

EXAMPLE 3

Figure 10:
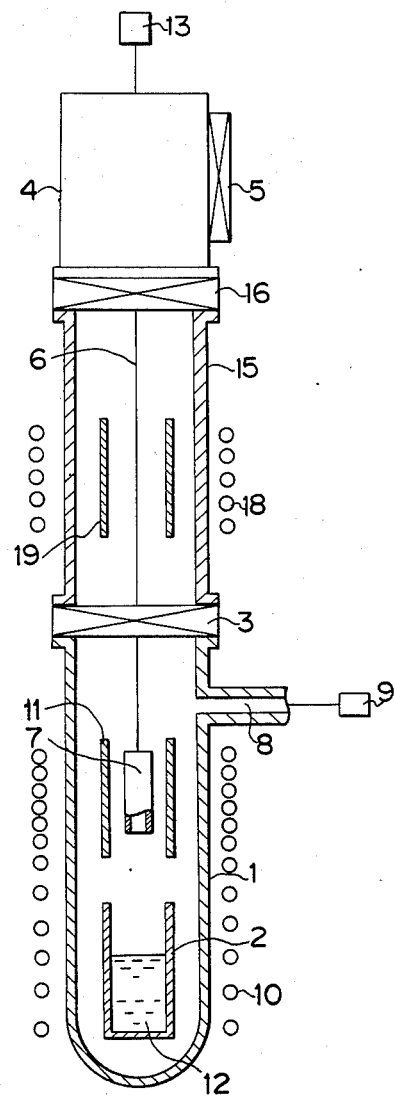

FIG. 10 shows schematically an example of an apparatus for producing an alumina composite body connected to a body of a silicon compound other than a silicon oxide. The reaction furnace 1 is made of quartz glass and is open at its top and closed at its bottom. A crucible 2 made of a high purity carbon is arranged within reaction furnace 1. A shutter 3 is placed on top of the reaction furnace 1. A heating portion 15 is disposed on top of shutter 3. An entrance portion 4 is mounted through a shutter 16 on top of heating portion 15. Another shutter 5 is positioned at one side of the entrance portion 4. A holding means, such as line 6, extends vertically through entrance portion 4, shutter 16, heating portion 15 and shutter 3. The upper part of holding means 6 is connected to a vertical actuation mechanism 13 so that holding means 6 can be raised and lowered. The lower end of holding means 6 is designed to hold a formed body 7. An outlet 8 is formed at one side toward the top reaction furnace 1 and connected to a vacuum pump 9. A heater 10 is spirally arranged outside reaction furnace 1. The coils of heater 10 adjacent crucible 2 are spaced further apart than those above crucible 2 so that the region above crucible 2 can be heated to a higher temperature. A tube 11 made of high purity carbon is arranged within the higher temperature region. Another heater 18 is arranged outside the heating portion 15, and an alumina tube 19 is disposed inside the heating portion 15. Crucible 2 is filled with molten aluminum 12 of 99.9% purity.

A cylindrical silicon carbide body 7 was prepared. Shutter 5 was opened, the cylindrically formed silicon carbide body 7 was attached to the lower end of holding means 6, and shutter 5 was closed. Next, shutter 16 was opened, and holding means 6 was lowered, after which shutter 16 was closed again. The formed silicon carbide body 7 was maintained in tube 19 and heated in air at a temperature of 1200° C. for 48 hours so that the formed silicon carbide body 7 was partially oxidized to produce silica. Shutter 3 was then opened; the formed body of partially oxidized silicon carbide was lowered further, and shutter 3 was closed again. Formed body 7 was immersed in the high purity molten aluminum 12 under a vacuum of 15 Torr at a temperature of 750° C. for 30 minutes. Aluminum and silica reacted according to the following equation:

$$4\ Al + 3\ SiO_2 \rightarrow 2\ Al_2O_3 + 3\ Si$$

so that the silica in the silicon carbide formed body 7 was changed into alumina. Thus, an alumina composite body which was connected the silicon carbide formed body was produced. The alumina composite body then was raised and removed from the molten aluminum 12. After the alumina composite body was lifted to a position within tube 11, it was heated at a temperature of 800° C. for 50 minutes. Next, the shutters 3 and 16 were opened, and the alumina composite body was lifted up to the entrance portion 4. Shutters 3 and 16 were then closed; shutter 5 was opened, and the alumina composite body was removed from holding means 6.

The resultant alumina composite body comprised alumina, aluminum and silicon. A solid solution of aluminum and silica tightly filled the pores of a porous alumina matrix comprising many elongated alumina elements oriented in random directions and interconnected. The alumina composite body was located on the surface of and connected to the silicon carbide formed body. The alumina composite body connected with the silicon carbide formed body exhibited a bending strength of 400 Mpa. This bending strength was superior to that of silicon carbide (100 Mpa).

EXAMPLE 4

Figure 11:
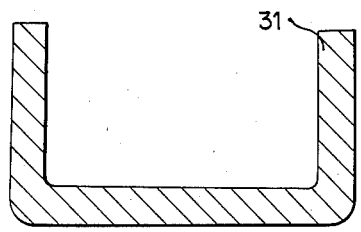
FIG. 11 and FIG. 12 are schematic explanatory views illustrating a preferred embodiment of the method of the invention.
Figure 12:
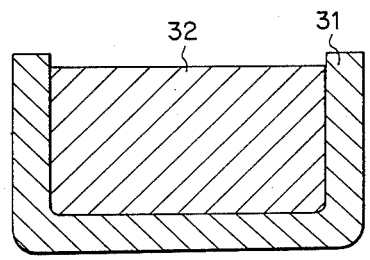

A method of manufacturing an alumina composite body which is connected with an aluminum body will now be explained with reference to FIGS. 11 and 12. A formed glass body 31 made of quartz glass was prepared. Formed glass body 31 had a vessel shape as shown in FIG. 11. Next, as shown in FIG. 12, molten aluminum 32 having a purity of 99.9% at a temperature of 750° C. was poured into the formed glass body 31 in an inert gas atmosphere and maintained for 3 hours. Aluminum and silica reacted according to the equation:

$$4\ Al + 3\ SiO_2 \rightarrow 2\ Al_2O_3 + 3\ Si$$

so that the silica in the formed glass body 31 was changed into alumina. An alumina composite body comprising alumina, aluminum and silica was produced. The alumina composite body was heated at a temperature of 800° C. for 50 minutes. Subsequently, the alumina composite body and the molten aluminum were cooled to a temperature lower than the melting point of aluminum so that the molten aluminum solidified to form an aluminum body connected to the alumina composite body.

EXAMPLE 5

A quartz glass tube having a diameter of 70 mm, a thickness of 6 mm and a length of 1000 mm was prepared. The inside of the quartz glass tube was sealed tightly by fixing quartz glass plates over the ends of the tube. Using a reaction furnace as shown in FIG. 9, aluminum having a purity of 99.9% was vapor-deposited onto the quartz glass tube under a vacuum of 15 Torr at a temperature of 1200° C. for 3 minutes. Aluminum and silica at the surface of the quartz glass tube reacted according to the equation:

$$4\ Al + 3\ SiO_2 \rightarrow 2\ Al_2O_3 + 3\ Si$$

so that the silica at the surface of the tube was changed into alumnia. Finally, the ends of the quartz glass tube were cut off to a desired length. The resulting tube had a two layer structure comprising an outer layer of alumina composite material and an inner layer of quartz glass. The alumina composite material constituting the outer layer of the tube had a thickness of 5 microns. The sagging value of the tube was only 1.17 when the tube was heated at a temperature of 1200° C. for 200 hours. A quartz glass comparison tube had a sagging value of 1.97. The sagging value of a tube means a ratio of its horizontal diameter to its vertical diameter. The tube comprising the alumina composite material layer and quartz glass layer is suitable for a furnace core tube for manufacturing semiconductors.

As described above, the alumina composite body of this invention can be produced easily, even if the product has a complex shape. The composite body of the invention has superior mechanical strength and abrasion resistance as well as improved toughness and lubricity in comparison with conventional alumina ceramic materials. Furthermore, in comparison with metals, the alumina composite body has a remarkably low specific gravity. Also, an alumina composite body connected to another material such as aluminum, quartz glass, silicon carbide or silicon nitride can be easily produced having excellent mechanical strength and abrasion resistance. Accordingly, the alumina composite body can be applied to engineering ceramics, bioceramics, heat resistant materials and so on.

The foregoing description and examples have been set forth merely to illustrate the invention and are not intended to be limiting. Since modifications of the described embodiments incorporating the spirit and substance of the invention may occur to persons skilled in the art, the scope of the invention is to be limited solely with respect to the appended claims and equivalents.

What is claimed is:

1. An alumina composite body comprising a plurality of elongated alumina elements oriented in random directions and interconnected so as to constitute a porous matrix, and aluminum and silicon tightly filling said porous matrix.

2. An alumina composite body according to claim 1, comprising from about 50 to 90% by weight alumina, from about 5 to 25% by weight aluminum and from about 2 to 25% by weight silicon.

3. An alumina composite body according to claim 1, wherein said aluminum and silicon constitute a solid solution.

4. An alumina composite body according to claim 1, integrally connected to another material.

5. An alumina composite body according to claim 4, wherein said another material is selected from the group consisting of aluminum, quartz glass and silicon compounds other than oxides of silicon.

6. An alumina composite body according to claim 5, wherein said silicon compounds comprise silicon carbide or silicon nitride.

7. An alumina composite body according to claim 4, wherein at least about 90% of the pores of said porous matrix have a pore radius of from about 0.1 micron to 10 microns.

8. An alumina composite body according to claim 1, wherein said porous matrix comprises fine pores having an average pore radius of from about 0.5 micron to 1.5 microns.

9. An alumina composite body according to claim 1, wherein said porous matrix has an apparent porosity of from about 20% to 30%.

10. An alumina composite body according to claim 1, which has a gas permeability of less than about 1%.

* * * * *